United States Patent [19]

Ehsani et al.

[11] Patent Number: 5,917,942

[45] Date of Patent: Jun. 29, 1999

[54] DEVICE AND METHOD FOR HANDWRITING RECOGNITION WITH ADAPTIVE WEIGHTING OF RECOGNITION DATA

[75] Inventors: Farzad Ehsani, Menlo Park; Liyang Zhou; John Lorne Campbell Seybold, both of Palo Alto; Elton B. Sherwin, Menlo Park; Kenneth J. Guzik, Santa Clara, all of Calif.

[73] Assignee: Motorla, Inc., Schaumburg, Ill.

[21] Appl. No.: 08/579,956

[22] Filed: Dec. 28, 1995

[51] Int. Cl.⁶ ...................................................... G06K 9/78
[52] U.S. Cl. ............................................ 382/189; 382/311
[58] Field of Search ..................................... 382/187, 189, 382/188, 220, 309, 310, 311; 345/173, 159, 160, 161

[56] References Cited

U.S. PATENT DOCUMENTS

| | | | |
|---|---|---|---|
| 4,297,528 | 10/1981 | Beno | 704/244 |
| 4,953,225 | 8/1990 | Togawa et al. | 382/179 |
| 4,955,060 | 9/1990 | Katsuki et al. | 382/212 |
| 4,972,496 | 11/1990 | Sklarew | 382/187 |
| 5,020,117 | 5/1991 | Ooi et al. | 382/185 |
| 5,144,683 | 9/1992 | Suzuki et al. | 382/203 |
| 5,204,914 | 4/1993 | Mason et al. | 382/161 |
| 5,285,505 | 2/1994 | Kim et al. | 382/161 |
| 5,399,874 | 3/1995 | Gonsalves et al. | 250/556 |
| 5,454,046 | 9/1995 | Carman, II | 382/187 |
| 5,544,260 | 8/1996 | Chefalas et al. | 382/187 |
| 5,550,930 | 8/1996 | Berman et al. | 382/187 |
| 5,563,964 | 10/1996 | Tanaka et al. | 382/292 |

Primary Examiner—Jon Chang
Attorney, Agent, or Firm—Hugh C. Dunlop

[57] ABSTRACT

An adaptive weighting handwriting recognition device and method compares information representing handwritten input with stored recognition data at least some of which has a weighting value associated therewith. The weighting values remains fixed during comparison of the handwritten input and stored recognition data and provide candidate recognition information, which can be further processed with user editing instructions to modify and correct the candidate recognition information. During user editing, the weighting values of the stored recognition data associated with the corrected candidate recognition information modified are varied to enhance the likelihood of correct future handwriting recognition.

13 Claims, 2 Drawing Sheets

DEVICE AND METHOD FOR HANDWRITING RECOGNITION WITH ADAPTIVE WEIGHTING OF RECOGNITION DATA

FIELD OF THE INVENTION

This invention relates generally to the field of handwriting recognition and more particularly to adaptive handwriting recognition.

BACKGROUND OF THE INVENTION

Handwriting recognition programs generally operate by comparing data generated from handwritten words or characters to stored recognition data in an attempt to correctly replicate the handwritten words or characters as typewritten text. Occasionally, the recognition process generates errors in the typewritten representation of the handwritten characters due to poor handwriting or deficiencies in the computer programs that attempt to recognize the handwritten characters. Accordingly, advanced handwriting recognition programs include weighting values associated with some or all of the stored recognition data that are used in the recognition process to improve the likelihood of correctly recognizing the handwritten input.

Advanced handwriting recognition programs have also experimented with gradually varying the weighting values associated with the stored recognition data responsive to the handwritten input as it is received and processed over time. In this way, the likelihood of correct recognition of handwritten input is further enhanced without so drastically altering the weighting values as to tailor the stored handwriting recognition data to a single individual.

However, known methods for adapting the weighting values of stored recognition data may actually reduce the accuracy of the handwriting recognition process since weight variations based upon handwritten input will cause the weighting values to be changed in response to user errors in the handwritten words and characters. The likelihood of impairing recognition accuracy in this manner is particularly acute if handwriting errors are not promptly corrected by the user. For this reason, prior adaptive weighting handwriting recognition techniques were designed to vary the weighting values of the stored character recognition data very gradually so as not to reduce recognition accuracy beyond the point of the potential benefits of adapting the recognition weighting values at all. The result of this practice, however, was to substantially extend the time before a user could appreciate the benefits of enhanced recognition accuracy via adapting the recognition weighting values.

Accordingly, to fully realize the benefits of an adaptive weighting handwriting recognition system, a weight variation process is needed that quickly improves recognition accuracy while minimizing the detrimental potential of reduced recognition accuracy known in prior attempts to provide adaptive handwriting recognition.

BRIEF DESCRIPTION OF THE DRAWINGS

FIG. 1 and FIG. 2 illustrate a computing device 10 suitable for use with the present invention. The computer device 10 may be, for example, a Thinkpad lap-top type computer made by IBM, or any of the so called IBM-compatible desk-top type machines. Alternately, a personal digital assistant, such as the Newton manufactured by Apple Computer, or the Envoy wireless communicator, made by Motorola, or similar computing devices could be employed with the present invention. As shown in FIG. 1, the computing device 10 includes a display 12 that may be used as an alternate to the keyboard 14 to input information by using a stylus 16 to select functions, enter instructions, or handwritten text, graphics, or other information onto the display 12.

Figure 1:
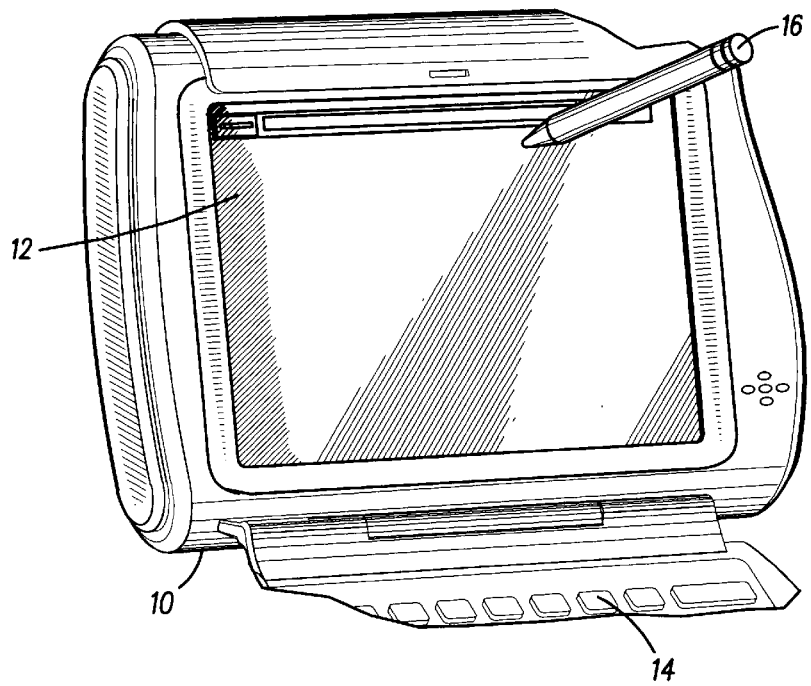
FIG. 1 is a perspective view of a computing device capable of utilizing the present invention.
Figure 2:
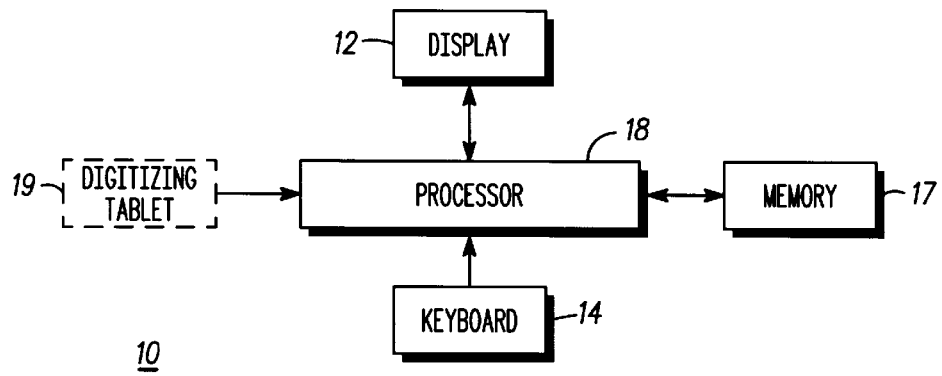
FIG. 2 is an exemplary block diagram of the computing device of FIG. 1.

As is known, contemporary computing devices typically include a processing component 18 such as a microprocessor or digital signal processor that, together with other general circuitry, execute the instructions of one or more software programs residing in a memory 17 that may include an operating system to control the functionality and operation of the computing device 10. Optionally, a conventional digitizing tablet 19 may be used to enter handwritten words or text allowing a conventional (non-digitizing or non-touch sensitive) display to be employed for the display 12. The digitizing table option may be particularly useful for a desk-top type computing device.

Figure 3:
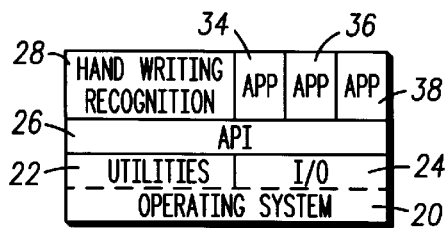
FIG. 3 is a graphic diagram illustrating an exemplary software program configuration of the device of FIG. 1 in accordance with the present invention.
Figure 4:
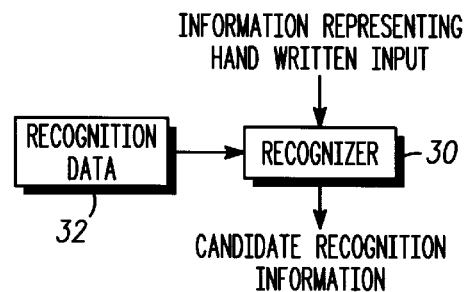
FIG. 4 is a block diagram of the handwriting recognition program of FIG. 3 in accordance with the present invention.

FIG. 3 illustrates a software program arrangement in accordance with the present invention to enable the computing device 10 of FIG. 1 to utilize the present invention. Overall control of the computing device is governed by an operating system 20. Typical operating systems includes utility programs 22 and input/output (I/O) 24 control, and generally interfaces with other software programs via an application programming interface (API) 26. In the preferred embodiment, the present invention comprises a software program 28 residing above the API layer and includes instructions and data to implement adaptive weighting handwriting recognition greatly superior to that of the prior art as will hereinafter become readily apparent.

The background of the present invention can be understood with reference to FIG. 1, FIG. 2, FIG. 3, and FIG. 4 in that a user would handwrite text (for example) onto the display 12 via the stylus 16. The I/O control portion 24 of the operating system 20 digitizes the handwriting via known techniques and sends information representing the handwritten input to the handwriting recognition program 28 via the API 26. Executing the instructions of the handwriting recognition program 28, the computing device 10 performs the functionality of any known recognition engine 30 and operates to compare the information representing the handwritten input with stored recognition data 32. The output of the recognition engine 30 is a list of candidate recognition information that, if correctly recognized, replicates the handwritten input as typewritten text on the display 12 and can be passed from the recognition program 28 to other application programs (such as a word processing program)

34–38. In the preferred embodiment, the recognition engine 30 comprises the Lexicus Longhand handwriting recognition program created by the Lexicus Division of Motorola. However, the present invention could be incorporated directly into the operating system 20 such as a utility 22 for implementing the functionality of the recognition engine 30 and using the I/O control 24 for passing recognized text to the application programs 34–38.

Figure 5:
FIG. 5 is an exemplary illustration depicting one embodiment of the weighted recognition data in accordance with the present invention.

FIG. 5 illustrates a table containing the recognition data 32 that is preferably stored in memory (17 in FIG. 2) components of the computing device. According to the present invention, the recognition data 32 includes a plurality of data templates 40 each having a weighting value 42 associated therewith. Any known data association technique (e.g., vectors, pointers, tables, or appending data) is suitable for use with the present invention to associate a particular data template with its weighting value. Alternately, the present invention contemplates that only certain of the data templates, such as, for example, the data templates known to cause the most recognition errors, could have an associated weighting value. The weighting values 42 are used by the recognition engine 30 via established practices to enhance the likelihood that the candidate recognition information correctly replicates the handwritten input. As will become apparent in conjunction with FIG. 6, the use of the weighting values 42, and when and how they are selectively varied, are central to the improvement of the present invention over all known techniques of adaptive weighting handwriting recognition.

Figure 6:
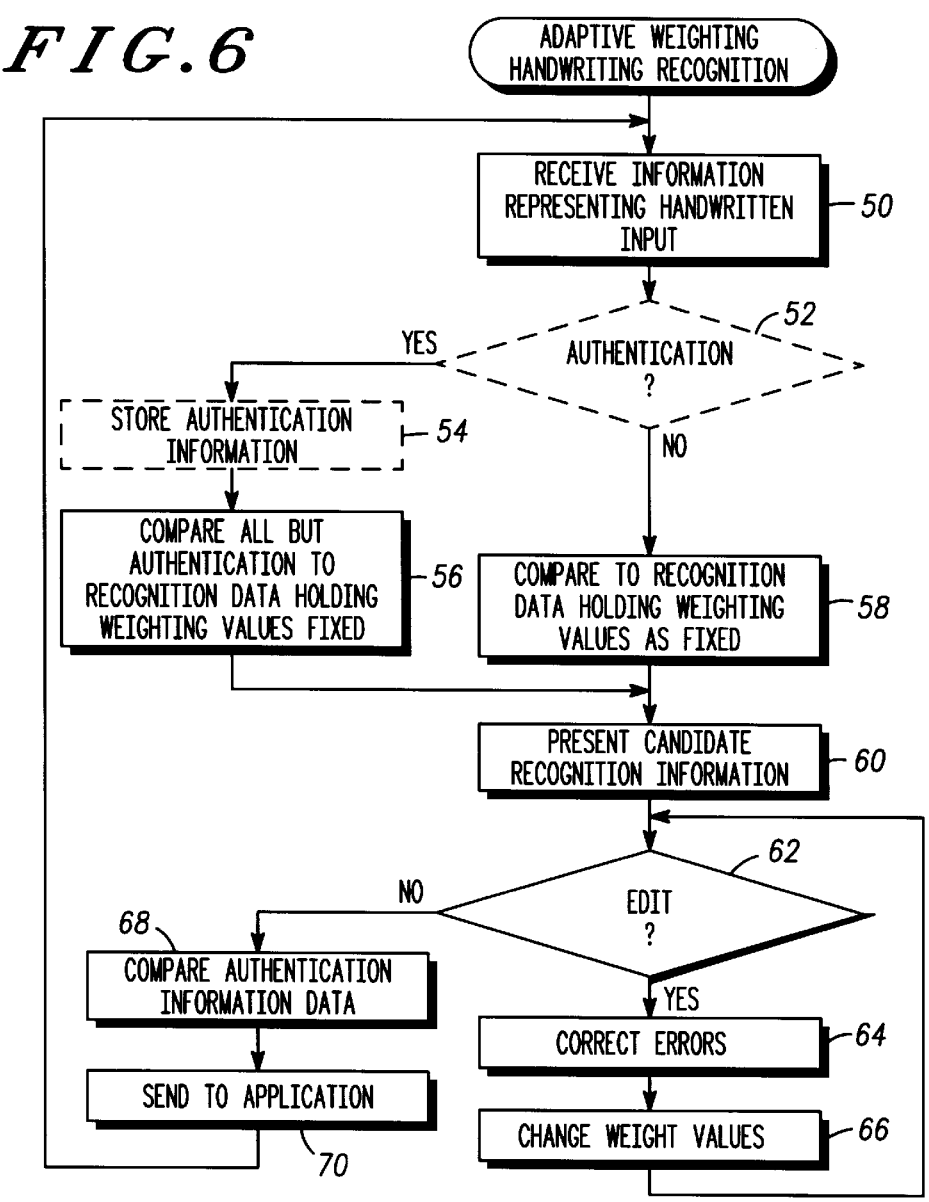
FIG. 6 is a flow diagram illustrating the preferred adaptive weighting handwriting recognition method (and optional authentication method) in accordance with the present invention.

FIG. 6 is a flow diagram illustrating the operation of the present invention. In step 50, information representing handwritten input is received from the display 12 of the computing device 10 shown if FIG. 1. Optionally, not all of the handwritten information may be intended for recognition. In this alternate embodiment of the present invention a personal signature or other symbol may be handwritten (at the end of a memo or letter for example) to be appended to the recognized text of the handwritten input for authentication. Decision 52 determines whether handwritten authentication information is included in the handwritten input, which is stored (step 54) and the information representing the handwritten input to be recognized is compared to the stored recognition data in step 56. Conversely, if authentication is not used, decision 52 precedes step 58 wherein the information representing the handwritten input to be recognized is compared to the stored recognition data and candidate recognition information is presented (step 60) to the user via the display 12 of the computing device 10 shown if FIG. 1.

Occasionally, the candidate recognition information comprises an errored representation of the handwritten input. This may be due to poor handwriting or deficiencies in the accuracy of the recognition engine. It is therefore common to have to edit the candidate recognition information in an editing mode provided in the handwriting recognition program. Decision 62 determines whether user instructions or commands have been received to edit and correct errored text in the candidate recognition information. An affirmative determination causes the editing mode to be entered and any errors in the typewritten replication of the handwritten input to be corrected (step 64). Next, the weighting values associated with the data templates used during the recognition and correction process are changed (step 66).

Unlike prior adaptive weighting handwriting recognition attempts, the present invention only varies the weighting values in an editing mode. In this way, the present invention avoids the detriments of adapting on the handwritten input itself in that the weighting values of the present invention are not adapted based on unedited errors in the handwritten input. For this reason, the present invention preferably substantially varies the weighing values in the editing process since both the data templates that resulted in the recognition error and the data template used to correct the error are known. Accordingly, the present invention modifies the weighting value of the data template that resulted in the error in the range of twenty-fifty percent to decrease the likelihood that this data template would be used by the recognition engine in the future on similar handwritten input. Also, the present invention modifies the weighting value of the data template used to correct the error in the range of twentyfifty percent to increase the likelihood that this data template will be used by the recognition engine in the future on similar handwritten input. The corrected recognition information (32 in FIG. 5) is then re-stored for future use.

The substantial variation of the weighting values affords the present invention an advantage in that the weighting values adapt to the user very quickly without changing so much that the handwriting recognition program becomes useful only by one user. That is, the preferred adaptive weighting handwriting recognition program according to the present invention is and remains writer independent.

When all editing is complete such that the candidate recognition information correctly replicates the handwritten input as typewritten text, decision 62 optionally combines the stored authentication information (step 68), if any, before sending the corrected candidate recognition information (step 70) to a user selected application program (34–38 in FIG. 3) for further processing or use by the user of the computing device. In this way, the present invention provides adaptive weighting handwriting recognition that offers rapid recognition enhancement via substantial weighting value modification without the detriment of inappropriate weighting value changes as such modification is affected only during editing of the candidate recognition information.

Figure 7:
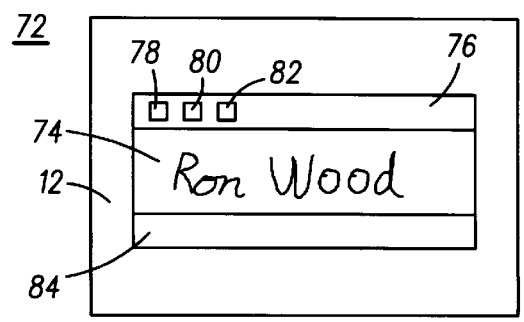
FIG. 7 is an exemplary illustration of a user interface to enter a signature or other symbols for the optional authentication steps of FIG. 6.

FIG. 7 illustrates a preferred embodiment of entering a personal signature or other symbol to be used as authentication information according to the present invention. In an authentication mode, a graphical image 72 is presented to the user on the display 12 of the computing device 10 of FIG. 1. Preferably, the graphical image 72 includes a signature area 74 and may also include a command area 76 (commonly referred to by those skilled in the art as a "toolbar") that includes several icons 78–82 used to affect editing or other functions and a status area 84 used to convey information to the user. In the illustrated example, the signature "Ronjon Nag" has been handwritten in the signature area 74 to be stored and later appended to other handwritten input or sent to other application programs (34–38 in FIG. 3) for the convenience of the user (in this case, Mr. Nag).

Accordingly, the present invention provides an adaptive weighting handwriting recognition system that quickly improves recognition accuracy.

What is claimed is:

1. A method, comprising the steps of:

inputting handwriting to a digitizer by means of a stylus;

digitizing the handwriting to provide handwritten input;

comparing information representing handwritten input with stored recognition data at least some of which has a weighting value associated therewith that remains fixed during comparison of the handwritten input and stored recognition data to identify candidate recognition information;

presenting the candidate recognition information via a display;

entering user instructions;

processing the candidate recognition information with user instructions to modify at least portions of the candidate recognition information to provide corrected recognition information and to vary the weighting value of the stored recognition data associated with the portions of the candidate recognition information modified during the processing thereof with the user instructions, and varying the weighting value of the stored recognition data used to provide the corrected recognition information to increase the likelihood of processing similar information representing handwritten input with the stored recognition data having the varied weighting value to increase the likelihood that future candidate recognition information correctly represents the handwritten input, including varying the weighting value of the stored recognition data used to provide the candidate recognition information, and associated with the portions thereof modified during processing with user instructions, to decrease the likelihood of processing similar information representing handwritten input with the stored recognition data associated with the modified portions of the candidate recognition information.

2. The method of claim 1, wherein the step of varying the weighting value comprises:

varying the weighting value of the stored recognition data used to provide the corrected recognition information in the range of twenty percent to fifty percent to increase the likelihood of processing similar information representing handwritten input with the stored recognition data having the varied weighting value to increase the likelihood that future candidate recognition information correctly represents the handwritten input; and varying the weighting value of the stored recognition data used to provide the candidate recognition information, and associated with the portions thereof modified during processing with user instructions, in the range of twenty percent to fifty percent to decrease the likelihood of processing similar information representing handwritten input with the stored recognition data associated with the modified portions of the candidate recognition information.

3. A method, comprising the steps of:

inputting handwriting to a digitizer by means of a stylus;

digitizing the handwriting to provide handwritten input;

comparing information representing handwritten input with stored recognition data at least some of which has a weighting value associated therewith that remains fixed during comparison of the handwritten input and stored recognition data to identify candidate recognition information;

presenting the candidate recognition information via a display;

entering user instructions; and processing the candidate recognition information with user instructions to modify at least portions of the candidate recognition information to provide corrected recognition information and to vary the weighting value of the stored recognition data associated with the portions of the candidate recognition information modified during the processing thereof with the user instructions, including varying the weighting value of the stored recognition data used to provide the candidate recognition information, and associated with the portions thereof modified during processing with user instructions, to decrease the likelihood of processing similar information representing handwritten input with the stored recognition data associated with the modified portions of the candidate recognition information.

4. The method of claim 3, wherein the step of varying the weighting value comprises varying the weighting value of the stored recognition data in the range of twenty percent to fifty percent.

5. A method, comprising the steps of:

inputting handwriting to a digitizer by means of a stylus;

digitizing the handwriting to provide handwritten input;

comparing information representing handwritten input with stored recognition data at least some of which has a weighting value associated therewith that remains fixed during comparison of the handwritten input and stored recognition data to identify candidate recognition information;

presenting the candidate recognition information via a display;

entering user instructions; and processing the candidate recognition information with user instructions to modify at least portions of the candidate recognition information to provide corrected recognition information and to vary the weighting value of the stored recognition data associated with the portions of the candidate recognition information modified during the processing thereof with the user instructions, wherein the step of comparing comprises comparing all except a selected portion of the information representing handwritten input with the stored recognition data to provide the candidate recognition information and authentication information.

6. The method of claim 5, wherein the step of processing comprises processing the candidate recognition information with user instructions to provide the corrected recognition information and includes the step of combining the corrected recognition information with the authentication information to provide authenticated recognition information.

7. A device, comprising:

a touch-sensitive display for receiving handwritten input and for providing information representing same;

a memory having recognition data stored therein at least some of which has a weighting value associated therewith to provide stored recognition data; and digital processing circuitry programmed to compare the information representing the handwritten input with the stored recognition data to identify candidate recognition information while maintaining the weighting values fixed during the comparison, the candidate recognition information to be processed by the digital processing circuitry with user instructions to modify at least portions of the candidate recognition information to provide corrected recognition information and to vary the weighting value of the stored recognition data associated with the portions of the candidate recognition information modified during the processing thereof with the user instructions, wherein the digital processing circuitry is further programmed to varying the weighting value of the stored recognition data used to provide the corrected recognition information to increase the likelihood of processing similar information representing handwritten input with the stored recognition data having the varied weighting value to increase the likelihood that future candidate recognition information correctly represents the handwritten input and wherein the digital processing circuitry is further programmed to vary the weighting value of the stored recognition data used to provide the candidate recognition information, and associated with the portions thereof modified during processing with user instructions, to decrease the likelihood of processing similar information representing handwritten input with the stored recognition data associated with the modified portions of the candidate recognition information.

8. The device of claim 7, wherein the digital processing circuitry is further programmed to vary the weighting value of the stored recognition data in the range of twenty percent to fifty percent.

9. A device, comprising:

a digitizing input device for receiving handwritten input and for providing information representing the handwritten input;

a display for displaying the handwritten input;

a memory having instructions and recognition data stored therein at least some of which has a weighting value associated therewith to provide stored recognition data; and digital processing circuitry including a digital processing device for processing the instructions stored in the memory to compare the information representing the handwritten input with the recognition data to identify candidate recognition information while maintaining the weighting values fixed during the comparison, the candidate recognition information to be processed by the digital processing circuitry with user instructions to modify at least portions of the candidate recognition information to provide corrected recognition information and to vary the weighting value of the stored recognition data associated with the portions of the candidate recognition information modified during the processing thereof with the user instructions, wherein the memory further contains instructions causing the digital processing circuitry to vary the weighting value of the stored recognition data used to provide the corrected recognition information in the range of twenty percent to fifty percent to increase the likelihood of processing similar information representing handwritten input with the stored recognition data having the varied weighting value to increase the likelihood that future candidate recognition information correctly represents the handwritten input, and to vary the weighting value of the stored recognition data used to provide the candidate recognition information, and associated with the portions thereof modified during processing with user instructions, in the range of twenty percent to fifty percent to decrease the likelihood of processing similar information representing handwritten input with the stored recognition data associated with the modified portions of the candidate recognition information.

10. A device, comprising:

a digitizing input device for receiving handwritten input and for providing information representing the handwritten input;

a display for displaying the handwritten input;

a memory having an operating system and application programs stored therein, and including handwriting recognition instructions and recognition data at least some of which has a weighting value associated therewith to provide stored recognition data; and digital processing circuitry including a programmable digital processing device capable processing the handwriting recognition instructions in accordance with the operating system to compare the information representing the handwritten input with the recognition data to identify candidate recognition information while maintaining the weighting values fixed during the comparison, the candidate recognition information to be processed by the digital processing circuitry with user instructions to modify at least portions of the candidate recognition information to provide corrected recognition information and to vary the weighting value of the stored recognition data associated with the portions of the candidate recognition information modified during the processing thereof with the user instructions, wherein the memory includes handwriting recognition instructions, that when executed by the digital processing circuitry, vary the weighting value of the stored recognition data used to provide the corrected recognition information to increase the likelihood of processing similar information representing handwritten input with the stored recognition data having the varied weighting value to increase the likelihood that future candidate recognition information correctly represents the handwritten input, and vary the weighting value of the stored recognition data used to provide the candidate recognition information, and associated with the portions thereof modified during processing with user instructions, to decrease the likelihood of processing similar information representing handwritten input with the stored recognition data associated with the modified portions of the candidate recognition information.

11. The device of claim 10, wherein the digitizing input device and the display comprise a touch-sensitive display.

12. The method of claim 10, wherein the memory includes handwriting recognition instructions, that when executed by the digital processing circuitry, varies the weighting values of the stored recognition data in the range of twenty percent to fifty percent.

13. The method of claim 10, wherein the memory includes handwriting recognition instructions, that when executed by the digital processing circuitry, compares all except a selected portion of the information representing handwritten input with the stored recognition data to provide the candidate recognition information and authentication information.

* * * * *